(12) United States Patent
Adeeb et al.

(10) Patent No.: US 10,822,025 B1
(45) Date of Patent: Nov. 3, 2020

(54) HYDRAULIC VALVE MODULE FOR STEERING AND WORK FUNCTIONS IN A WORK VEHICLE

(71) Applicant: Caterpillar SARL, Geneva (SE)

(72) Inventors: Adam Adeeb, Seaham (GB); Steven Johnson, Metamora, IL (US)

(73) Assignee: Caterpillar SARL, Geneva (CH)

( * ) Notice: Subject to any disclaimer, the term of this patent is extended or adjusted under 35 U.S.C. 154(b) by 0 days.

(21) Appl. No.: 16/574,124

(22) Filed: Sep. 18, 2019

(51) Int. Cl.
*F15B 11/17* (2006.01)
*B62D 5/07* (2006.01)

(52) U.S. Cl.
CPC .............. *B62D 5/075* (2013.01); *F15B 11/17* (2013.01)

(58) Field of Classification Search
CPC ... F15B 11/17; F15B 11/162; F15B 2211/781; F15B 2211/20576; F15B 2211/20553; B62D 5/075
See application file for complete search history.

(56) References Cited

U.S. PATENT DOCUMENTS

| | | | |
|---|---|---|---|
| 6,422,121 B1* | 7/2002 | Wysong | B65G 53/4633 91/356 |
| 6,931,847 B1* | 8/2005 | Throckmorton | F15B 11/162 60/422 |
| 8,756,930 B2* | 6/2014 | Johnson | B62D 5/075 60/430 |
| 9,915,056 B2 | 3/2018 | Tanaka et al. | |
| 2017/0274930 A1* | 9/2017 | Zhang | E02F 9/2203 |
| 2017/0335867 A1* | 11/2017 | Meehan | B62D 5/07 |

FOREIGN PATENT DOCUMENTS

| | | |
|---|---|---|
| CN | 102030035 | 9/2012 |
| CN | 105134678 | 12/2015 |
| CN | 204985136 | 1/2016 |
| JP | 2008162410 | 7/2008 |
| RU | 1782838 | 12/1992 |
| WO | 2013179502 | 12/2013 |

* cited by examiner

*Primary Examiner* — Abiy Teka

(57) ABSTRACT

A hydraulic valve module (2000) for a vehicle (10) is configured to receive hydraulic pressure from a first pump (61) via a first pump inlet (2205) in a first interface surface when connected to a first adjacent module (1000), and from a second pump (62) via an external port (2006). The module (2000) combines both flows to supply a work function circuit (40) of a vehicle via a port (2301) formed in a second interface surface to communicate with a second adjacent module (3000). The module (2000) prioritises flow from the second pump (62) to a steering circuit (50) over the work function circuit, and restricts flow from the first pump (61) to the work function circuit to prioritise and maintain pressure in the first adjacent module upstream of the first pump inlet (2205) which may supply service brake and cooling fan circuits (21, 22, 30) of the vehicle.

6 Claims, 3 Drawing Sheets

HYDRAULIC VALVE MODULE FOR STEERING AND WORK FUNCTIONS IN A WORK VEHICLE

TECHNICAL FIELD

This disclosure relates to modular valve assemblies for supplying hydraulic pressure to operate steering, work equipment such as a tipping body, and other hydraulic functions of a work vehicle.

BACKGROUND

It is known to provide an articulated dump truck with a main valve assembly formed as a unitary valve block with multiple hydraulic circuits for supplying hydraulic pressure to operate the steering, service brakes and cooling fan, and having hydraulic lines to supply pressure to a second valve assembly located elsewhere on the vehicle. The second valve assembly is configured to control the tipping body or other work equipment of the vehicle responsive to operator commands received at the second valve block.

In such arrangements, it is known to supply pressure to the main valve assembly from two or more pumps, wherein a first one of the pumps supplies the service brake and cooling fan circuits, and a second one of the pumps supplies the steering circuit. A third pump may provide a redundant supply to the steering circuit in parallel with the second pump. The use of two or three separate pumps instead of a single, larger pump makes it easier to fit the pumps into the available space on the chassis of the vehicle, and ensures that adequate flow is available to operate both the service brake and fan circuit and the steering circuit simultaneously at peak demand.

A tipping body or other work equipment of the vehicle will typically be operated when the vehicle is stationary so that the brake and steering functions are not in use, and may require high power or a high flow rate for satisfactory operation when the vehicle is fully loaded. Accordingly, it is known to configure the main valve assembly to combine the supply from both the first and second pumps to power the work equipment via priority valves which prioritise flow to the steering, service brake and fan circuits when required.

The known main valve assembly protects both steering and service brake and fan circuits against excess demand from the work function circuit, and so makes it possible to combine the flow from both of the first and second pumps to improve operation of the work equipment. However, the valve block is large and complex and is difficult to adapt for use in different vehicles with different equipment specifications.

In order to provide a more adaptable arrangement, it is known to build a hydraulic valve assembly from modular blocks. Each valve block defines internal flowpaths which open through ports formed in one or more interface surfaces, typically defined by the flat sides of the block. By connecting two or more blocks together with their interface surfaces in abutting relation the ports are placed in fluid communication so that the hydraulic circuits of the different blocks are functionally interconnected.

By way of example, U.S. Pat. No. 6,325,170 discloses a modular valve assembly supplied from a hydraulic pump.

US 2016/0317956 A1 discloses a tracked mining shovel having a modular valve assembly supplying a plurality of hydraulic circuits from a plurality of hydraulic pumps. The valve assembly includes filter modules, junction modules for combining the flow via two of the filter modules from two of the pumps, and valve modules operable to direct the flow from the junction modules, selectively to actuate either or both of the bucket and the tracks.

SUMMARY

In accordance with the present disclosure there is provided a hydraulic valve module for use in a vehicle.

The vehicle includes a plurality of wheels, an equipment for carrying out a work function of the vehicle, a plurality of hydraulic circuits, and first and second hydraulic pumps for supplying hydraulic pressure to the hydraulic circuits.

The hydraulic circuits include a steering circuit including at least one steering actuator for steering the wheels, and a work function circuit including at least one equipment actuator for operating the equipment.

The hydraulic valve module includes a plurality of valves, and a monolithic valve block.

The valve block has a plurality of internal flowpaths, an external, first interface surface, an external, second interface surface, and at least one further external surface.

The first interface surface is sealingly connectable, in a connected configuration, to a corresponding interface surface of a further, fan and brake function valve module, while the second interface surface is sealingly connectable, in the connected configuration, to a corresponding interface surface of a further, work control valve module.

The valves are arranged in fluid communication with respective ones of the internal flowpaths to define a work function supply circuit for supplying hydraulic pressure from each of a first pump inlet and a second pump inlet to a work function outlet, and a steering supply circuit for supplying hydraulic pressure from the second pump inlet to a steering supply outlet.

The first pump inlet opens through the first interface surface to receive a supply of hydraulic pressure from the first pump via the fan and brake function valve module in use in the connected configuration, while the second pump inlet opens through the at least one further external surface to receive a supply of hydraulic pressure from the second pump in use.

The steering supply outlet opens through the at least one further external surface to supply hydraulic pressure from the steering supply circuit to the steering circuit of the vehicle in use.

The work function outlet opens through the second interface surface to supply hydraulic pressure from the work function supply circuit via the work control valve module to the work function circuit of the vehicle in use in the connected configuration.

The plurality of valves include a steering function priority valve, and a fan and brake function priority valve.

The steering function priority valve is configured to receive a steering load sensing pressure signal from a steering load sensing pressure signal port opening through the at least one further external surface.

The steering function priority valve is operable responsive to the steering load sensing pressure signal to restrict the supply of hydraulic pressure from the second pump inlet to the work function outlet so as to maintain the supply of hydraulic pressure from the second pump inlet to the steering supply outlet.

The steering load sensing pressure signal is received in use from the steering circuit of the vehicle.

The fan and brake function priority valve is configured to receive a fan and brake function load sensing pressure signal from a fan and brake function load sensing pressure signal port that opens through the first interface surface.

The fan and brake function priority valve is operable responsive to the fan and brake function load sensing pressure signal to restrict the supply of hydraulic pressure from the first pump inlet to the work function outlet so as to maintain hydraulic pressure upstream of the first pump inlet.

The fan and brake function load sensing pressure signal is received from the fan and brake function valve module in use in the connected configuration.

In the following description, an embodiment of the hydraulic valve module is referred to as the steering and work function module 2000.

BRIEF DESCRIPTION OF THE DRAWINGS

Further features and advantages will be apparent from the following illustrative embodiment which will now be described, purely by way of example and without limitation to the scope of the claims, and with reference to the accompanying drawings, in which:

Reference numerals and characters appearing in more than one of the figures indicate the same or corresponding elements in each of them.

DETAILED DESCRIPTION

Figure 1:
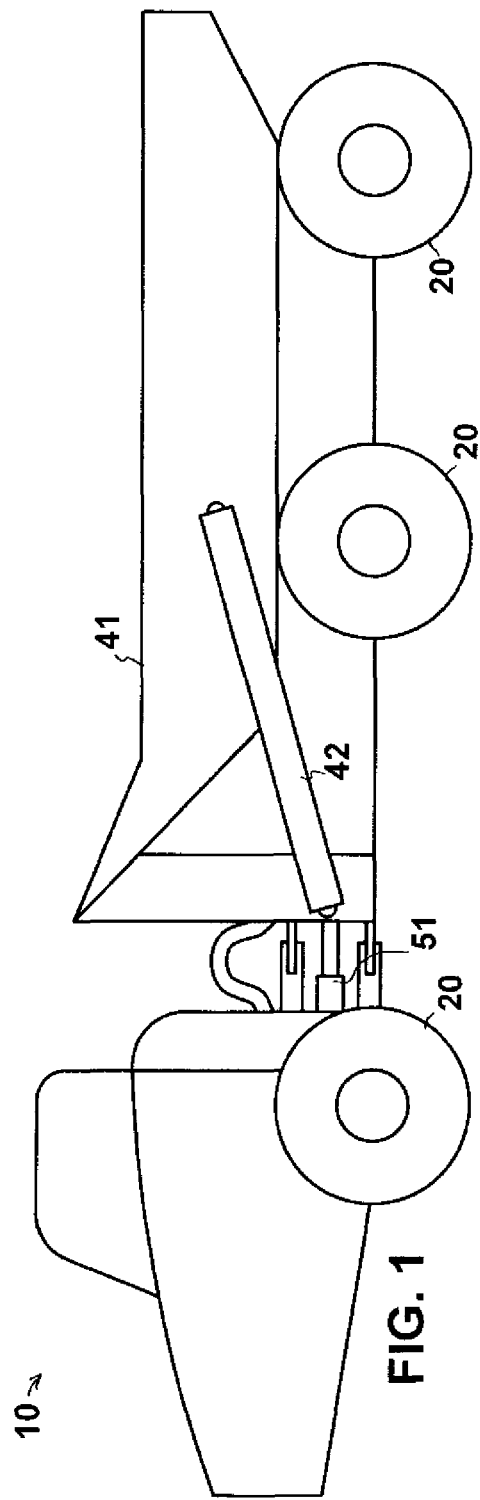
FIGS. 1 and 2 are respectively a side view and a schematic plan view of a vehicle.
Figure 2:
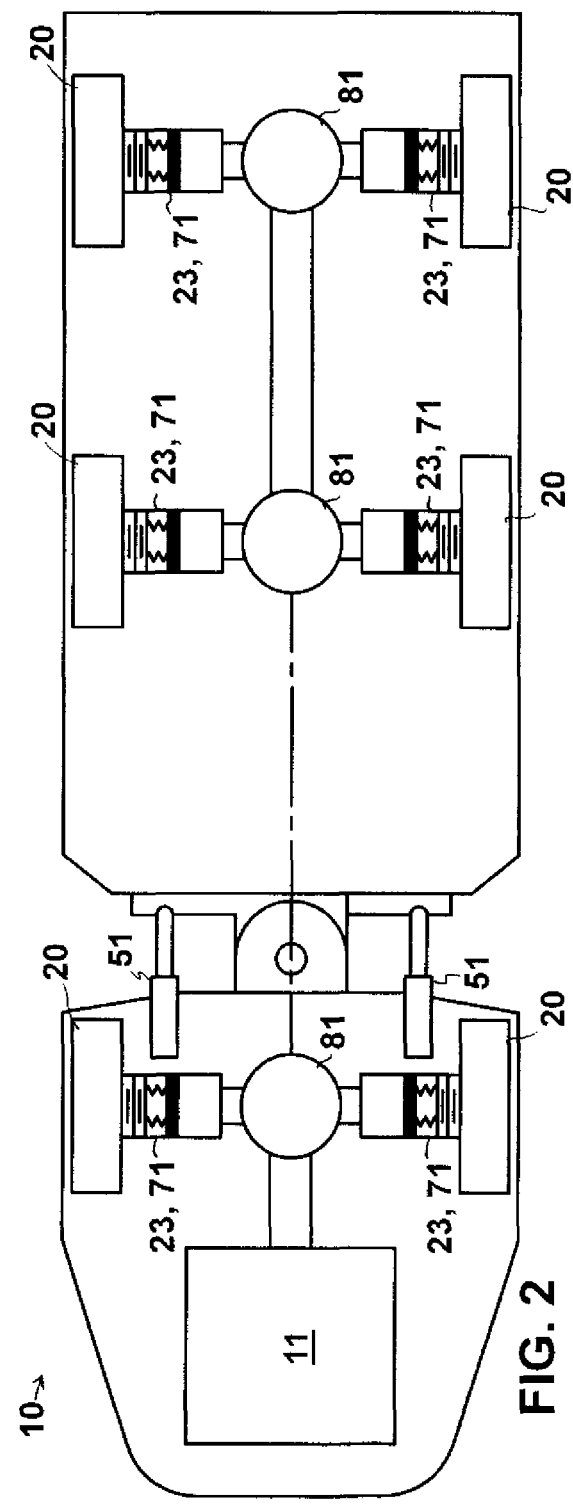
Figure 3:
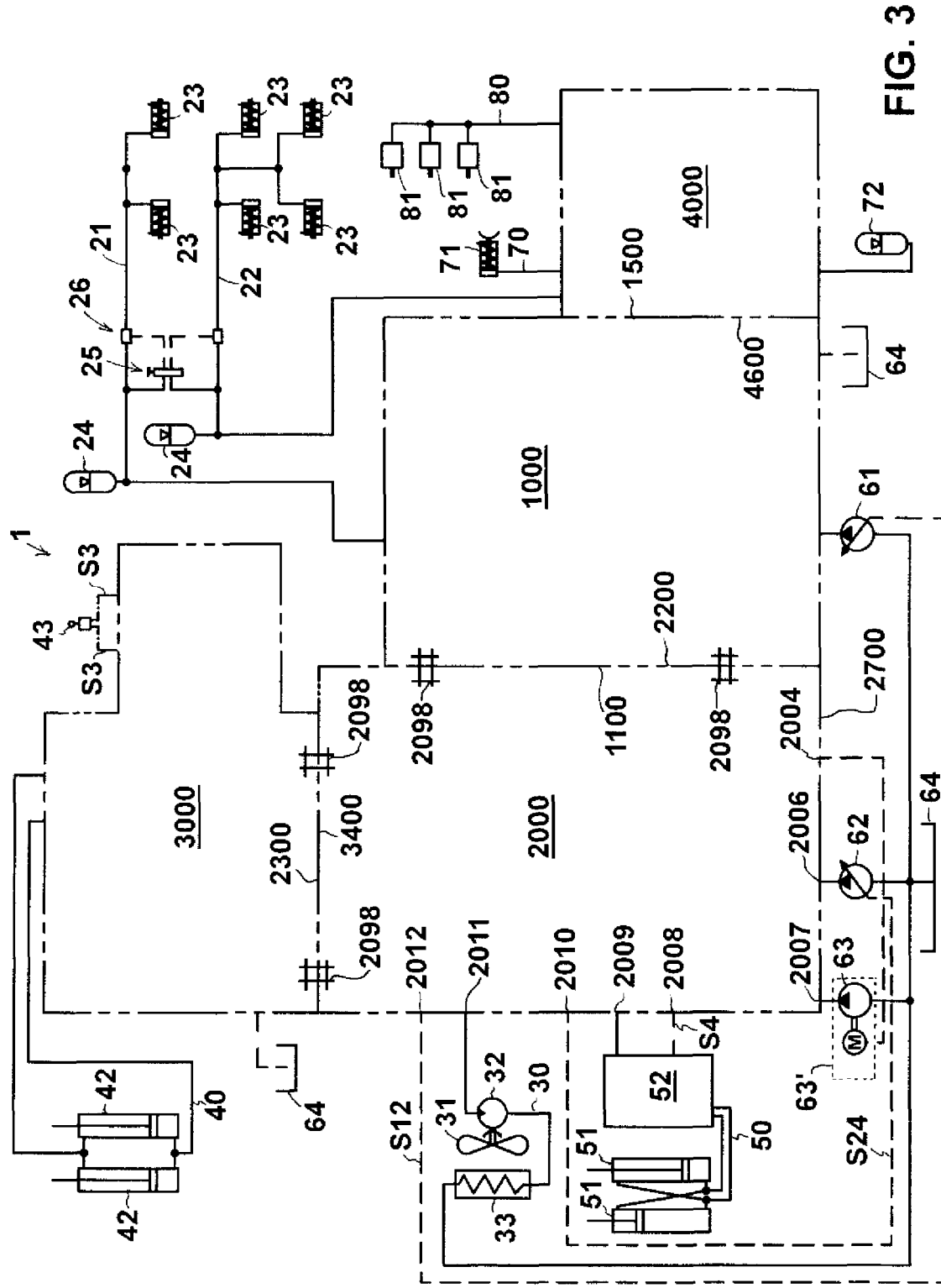
FIG. 3 shows various functional elements of the vehicle including a valve assembly comprising four valve modules 1000, 2000, 3000, 4000 shown in outline in a connected configuration.

Referring to FIGS. 1-3, a vehicle 10 includes a plurality of wheels 20, an equipment 41 for carrying out a work function of the vehicle, a plurality of hydraulic circuits 21, 22, 30, 40, 50, 70, 80, and first and second hydraulic pumps 61, 62, optionally also a third hydraulic pump 63, for supplying hydraulic pressure to the hydraulic circuits. The third pump 63 may be driven by a different prime mover from the other pumps, for example, by a motor M. A tank or tanks 64 may be arranged to hold the hydraulic fluid. The vehicle may further include a cooling fan 31 and other hydraulically actuated equipment as known in the art.

In this specification, unless the context suggests otherwise, hydraulic pressure is understood to refer to pressure or both pressure and flow of hydraulic fluid, depending on the application—for example, pressure with little or no flow may be used as a signal to control hydraulic valves, while both pressure and substantial flow may be required to operate the work equipment of the vehicle.

The hydraulic circuits include a work function circuit 40 and a steering circuit 50, and may further include first and second service brake circuits 21, 22, a fan circuit 30, a parking brake circuit 70 for operating parking brake actuators 71, and a differential lock circuit 80 for operating one or more differential locks 81 in the vehicle transmission.

Each service brake circuit 21, 22 includes at least one respective service brake actuator 23 for braking the wheels 20, and may also include a respective hydraulic accumulator 24. The first and second service brake circuits 21, 22 may be operable by a user control, e.g. a pedal 25, and optionally also by an automatic retarding system 26. In the illustrated embodiment, the vehicle 10 is an articulated truck, and the first and second service brake circuits act respectively on the two front wheels of the tractor unit and the four rear wheels of the trailer unit.

The fan circuit 30 includes a fan actuator 32 for operating the cooling fan 31, and optionally also a heat exchanger 33 which may be configured as an oil cooler from which heat is extracted to the cooling airflow from the fan. The fan 31 may also (or alternatively) extract heat from the coolant circuit of the engine 11 of the vehicle.

The steering circuit 50 includes at least one steering actuator 51 for steering the wheels 20, for example, responsive to user input via steering controls 52. In the illustrated embodiment there are two steering actuators 51 which rotate the tractor unit including the front wheels about its coupling to the trailer unit; other steering arrangements of course are possible.

The work function circuit 40 includes at least one equipment actuator 42 for operating the equipment 41. In the illustrated embodiment the equipment 41 is a tipping body of the vehicle, and the equipment actuator 42 includes one or more hydraulic rams for raising and lowering the tipping body. In alternative embodiments the work equipment could be, for example, a bucket or grab or other operable tool mounted on the vehicle.

The vehicle may include a work function control signal generator 43 operable by a user to generate a work function control signal S3 to control the equipment. The work function control signal may be for example an electrical signal or a hydraulic pressure signal. In the illustrated embodiment, the work function control signal S3 is an electrical signal for raising and lowering the tipping body.

The vehicle further includes a hydraulic valve assembly 1 formed from a number of hydraulic valve modules 1000, 2000, 3000, 4000 for controlling the hydraulic pressure (which is to say, hydraulic pressure and flow of hydraulic fluid) supplied to the various hydraulic circuits of the vehicle. The hydraulic valve modules include a fan and brake function module 1000, a steering and work function module 2000, a work control valve module 3000, and optionally also an auxiliary module 4000.

Each valve module defines at least one interface surface with multiple ports opening through the interface surface, so that the valve modules can be sealingly connected together with their interface surfaces in abutting relation to place their corresponding ports and internal flowpaths in fluid communication.

The fan and brake function module 1000 has two external interface surfaces 1100, 1500, and is configured to control a supply of hydraulic pressure to the fan circuit 30 and the service brake circuits 21, 22. Its internal flowpaths are in fluid communication with internal flowpaths of the steering and work function module 2000 via ports formed in interface surface 1100 to communicate with ports 2201, 2202, 2203, 2204, and 2205 of the steering and work function module in the connected configuration, and with internal flowpaths of the auxiliary module 4000 via ports in interface surface 1500. The external surfaces of the fan and brake function module 1000 which remain exposed in the connected configuration include an inlet for receiving a supply of hydraulic pressure from the first pump 61, and outlets for supplying hydraulic pressure from the first pump 61 to the first and second service brake circuits 21, 22.

For vehicles that do not require the functions of the steering and work function module 2000, the fan and brake function module 1000 can be installed for use without the steering and work function module 2000, in which case the fan circuit 30 of the vehicle can be supplied from the respective outlet port in the exposed interface surface 1100. In the connected configuration, the outlet port in the interface surface 1100 to the fan circuit 30 is arranged in fluid communication with an inlet port 2202 and extension flowpath 2028 of the steering and work function module 2000, so that the fan circuit 30 is supplied with hydraulic pressure via the steering and work function module 2000.

The auxiliary module 4000 is connectable via its external interface surface 4600 to interface surface 1500 of the fan and brake function module 1000. The auxiliary module 4000 receives pressure from the first pump 61 via the fan and brake function module 1000 via corresponding ports in the connected interface surfaces 4600, 1500 to supply the parking brake circuit 70 and the differential lock circuit 80 of the vehicle via respective ports formed on the external surface of the auxiliary module 4000. Another external port facilitates connection of the parking brake circuit 70 to a hydraulic accumulator 72. A further external port is provided for connection to the second service brake circuit 22, which is supplied via a flowpath in the auxiliary module 4000 from the fan and brake function module 1000 via further, intercommunicating ports opening through the interface surfaces 4600, 1500 in the connected configuration as shown.

The work control module 3000 is configured to receive the work function control signal S3, and includes a work function control valve assembly which is in fluid communication with the work function circuit 40 of the vehicle via ports formed in an external surface of the work control module 3000 that remains exposed in the connected configuration. The work function control valve assembly may be operable by a work function pilot pressure supply P1, responsive to the work function control signal S3, to control the pressure supplied to the work function circuit 40 of the vehicle and so to control the operation of the at least one equipment actuator 42.

The work control module 3000 also includes an external interface surface 3400. The internal flowpaths of the work control module 3000 are in fluid communication with internal flowpaths of the steering and work function module 2000 via several ports formed in the external interface surface 3400 to communicate with ports 2301, 2302, 2303, 2304 of the steering and work function module 2000 in the connected configuration.

The work control module 3000 may be configured to output a work function load sensing pressure signal S2 indicative of variations in load on the work function circuit 40 of the vehicle, as further discussed below.

Figure 4:
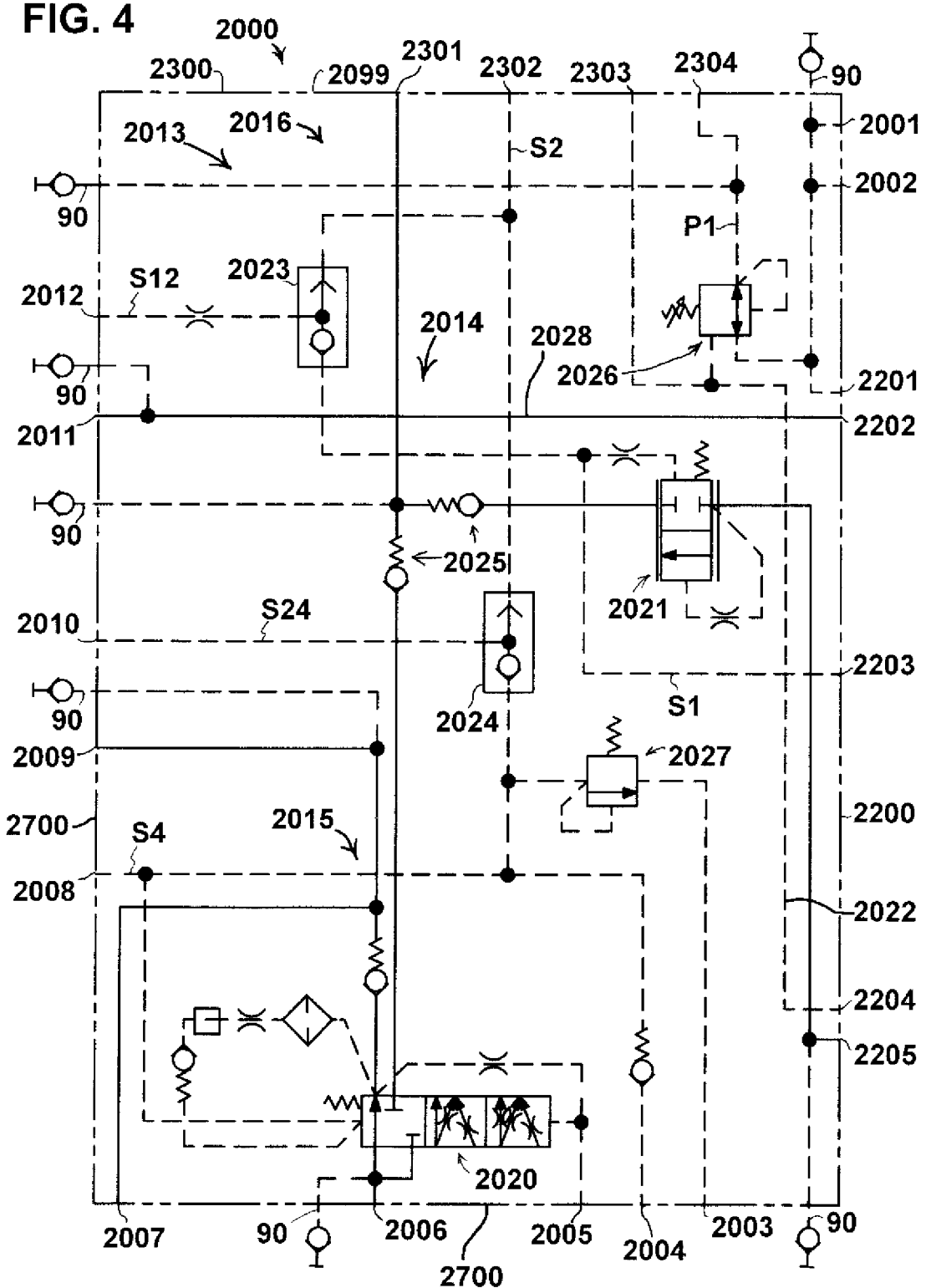
FIG. 4 shows the steering and work function module 2000 of the valve assembly.

Referring now also to FIG. 4, the novel hydraulic valve module is exemplified by the steering and work function module 2000, which is shown in FIG. 3 in the connected configuration as part of the valve assembly 1.

The steering and work function module 2000 includes a plurality of valves 2016, and a monolithic valve block 2099 which has a plurality of internal flowpaths 2013, an external, first interface surface 2200, an external, second interface surface 2300, and at least one further external surface 2700.

The valves 2016 may be mounted in recesses formed in the valve block, and/or in housings mounted on the valve block, and are fluidly connected together by respective ones of the internal flowpaths. The internal flowpaths 2013 may be formed by casting or machining and are indicated generally in the drawings by solid lines for main pressure supply flowpaths, and broken lines for pressure signal flowpaths or return flowpaths to tank.

The first interface surface 2200 is sealingly connectable, in a connected configuration, to a corresponding interface surface 1100 of the fan and brake function valve module 1000, while the second interface surface 2300 is sealingly connectable, in the connected configuration, to a corresponding interface surface 3400 of the work control valve module 3000.

The internal flowpaths 2013 communicate with multiple ports formed respectively in each of the first and second interface surfaces 2200, 2300, and in the at least one further external surface 2700 which as shown may extend over more than one external side of the module 2000. In the connected configuration as shown in FIG. 3, the ports formed in the interface surfaces 2200, 2300 are arranged in fluid communication with corresponding ports of the corresponding interface surfaces 1100, 3400 of the adjacent valve modules 1000, 3000 so that hydraulic pressure is transmitted through the communicating ports between the valve modules, as discussed in more detail below.

The steering and work function module 2000 may include connection elements 2098 for sealingly connecting the respective modules together in the connected configuration. The connection elements 2098 could comprise for example one or more fixings or fixing receiving portions such as connection holes or connection flanges for receiving screws or other connectors that connect the modules together with their respective interface surfaces sealingly engaged together in the connected configuration, as shown in FIG. 3.

The valves 2016 include a steering function priority valve 2020 and a fan and brake function priority valve 2021, and are arranged in fluid communication with respective ones of the internal flowpaths 2013 to define a work function supply circuit 2014 and a steering supply circuit 2015.

The ports include first and second pump inlets 2205, 2006, a steering supply outlet 2009, a work function outlet 2301, a steering load sensing pressure signal port 2008, and a fan and brake function load sensing pressure signal port 2203.

The first pump inlet 2205 and the fan and brake function load sensing pressure signal port 2203 open through the first interface surface 2200 to communicate with corresponding ports and internal flowpaths of the fan and brake function module 1000 in the connected configuration.

The work function outlet 2301 opens through the second interface surface 2300 to supply hydraulic pressure from the work function supply circuit 2014 in the connected configuration, via a corresponding port and internal flowpath of the work control valve module 3000, to the work function control valve assembly of the work control valve module 3000, which in turn supplies pressure to the work function circuit 40 of the vehicle.

The second pump inlet 2006, the steering supply outlet 2009, and the steering load sensing pressure signal port 2008 open through the at least one further external surface 2700.

In use, when the modules are connected together in the connected configuration with the first pump 61 connected to an inlet in the fan and brake function module 1000 as shown in FIG. 3, the first pump inlet 2205 receives a supply of hydraulic pressure from the first pump 61 via an internal flowpath of the fan and brake function module 1000 which opens through a corresponding port in the interface surface 1100.

The second pump inlet 2006 receives a supply of hydraulic pressure from the second pump 62 when the second pump 62 is connected to the inlet 2006 in use.

The steering supply outlet 2009 is connected to the steering circuit 50 of the vehicle and supplies hydraulic pressure from the steering supply circuit 2015 to the steering circuit 50. The pressure is applied to operate the at least one steering actuator 51 responsive to user input via the steering controls 52.

In order to ensure adequate hydraulic flow to the work function circuit 40, the work function supply circuit 2014 is configured to control a supply of hydraulic pressure from each of the first and second pumps 61, 62 via the first pump inlet 2205 and the second pump inlet 2006 to the work function outlet 2301.

The work function supply circuit 2014 includes the steering function priority valve 2020 and the fan and brake function priority valve 2021, and may further include two check valves 2025 through each of which the flow of hydraulic fluid passes from a respective one of the first and second pumps 61, 62. The flow from the two pumps is combined downstream of the two check valves, which ensure that each pump supplies only its respective circuits, and then the combined flow is directed to the work function outlet 2301.

The steering supply circuit 2015 includes the steering function priority valve 2020 and is configured to supply hydraulic pressure from the second pump inlet 2006 to the steering supply outlet 2009.

The steering circuit 50 is configured to output a steering load sensing pressure signal S4 which indicates load on the steering circuit 50. The steering function priority valve 2020 is configured to receive the steering load sensing pressure signal S4 from the steering circuit 50 via the steering load sensing pressure signal port 2008, and is operable responsive to the steering load sensing pressure signal S4 to restrict the supply of hydraulic pressure from the second pump inlet 2006 to the work function outlet 2301 so as to maintain the supply of hydraulic pressure from the second pump inlet 2006 to the steering supply outlet 2009.

The steering function priority valve 2020 may restrict the supply of hydraulic pressure from the second pump 62 to the work function outlet 2301, so as to maintain the supply of hydraulic pressure from the second pump 62 to the steering supply outlet 2009, responsive to increasing load on the steering circuit 50.

The fan and brake function valve module 1000 is configured to output a fan and brake function load sensing pressure signal S1 indicative of variations in load on the fan circuit 30 and first and second service brake circuits 21, 22 of the vehicle. The fan and brake function load sensing pressure signal S1 is received by the fan and brake function priority valve 2021 via the fan and brake function load sensing pressure signal port 2203 in the connected configuration.

The fan and brake function priority valve 2021 is operable responsive to the fan and brake function load sensing pressure signal S1 to restrict the supply of hydraulic pressure from the first pump inlet 2205 to the work function outlet 2301 so as to maintain hydraulic pressure upstream of the first pump inlet 2205.

In the connected configuration, the fan and brake function priority valve 2021 may restrict the supply of hydraulic pressure from the first pump 61 to the work function outlet 2301, so as to maintain the upstream supply of hydraulic pressure from the first pump 61 via the fan and brake function module 1000 to the first and second service brake circuits 21, 22 and the fan supply circuit 30, responsive to increasing load on any of the fan circuit 30 and the first and second service brake circuits 21, 22.

The operation of the first and second pumps 61, 62 may be controllable by control pressure signals, for example, to modulate the flow rate from each pump.

For this purpose the valves 2016 may further include first and second load sensing shuttle valves 2023, 2024.

The first load sensing shuttle valve 2023 is configured to receive and resolve the fan and brake function load sensing pressure signal S1 from the fan and brake function load sensing pressure signal port 2203, and the work function load sensing pressure signal S2 which is received in the connected configuration from a port opening through the interface surface 3400 of the work function module 3000 via a corresponding work function load sensing pressure signal port 2302 opening through the second interface surface 2300 of the steering and work function module 2000.

Based on the fan and brake function load sensing pressure signal S1 and the work function load sensing pressure signal S2, the first load sensing shuttle valve 2023 is configured to produce a first pump control pressure signal S12 which is applied to a first pump control pressure signal port 2012 opening through the at least one further external surface 2700 and connected to a control system of the first pump 61 to control the first pump 61 in use.

Signal S12 may be either respective one of signals S1 and S2 which is at a higher pressure than the other. Thus, signal S12 from valve 2023 controls the first pump 61 responsive to the combined demand from each of the loads that it supplies.

The second load sensing shuttle valve 2024 is configured to receive and resolve the steering load sensing pressure signal S4 from the steering load sensing pressure signal port 2008, and the work function load sensing pressure signal S2 from the work function load sensing pressure signal port 2302.

Based on the steering load sensing pressure signal S4 and the work function load sensing pressure signal S2, the second load sensing shuttle valve 2024 is configured to produce a second pump control pressure signal S24 which is applied to a second pump control pressure signal port 2010 opening through the at least one further external surface 2700 and connected to a control system of the second pump 62 to control the second pump 62 in use.

Signal S24 may be either respective one of signals S4 and S2 which is at a higher pressure than the other. Thus, signal S24 from valve 2024 controls the second pump 62 responsive to the combined demand from each of the loads that it supplies.

The steering supply outlet 2009 may be arranged in fluid communication with a third pump inlet 2007 which opens through the at least one further external surface 2700 to receive a supply of hydraulic pressure from the third hydraulic pump 63, which is connected in use to the inlet 2007 to provide a secondary supply of hydraulic pressure to the steering circuit 50.

In order to control operation of the third pump 63, the steering load sensing pressure signal S4 may be arranged in fluid communication with a third pump control port 2004 opening through the at least one further external surface 2700.

The third pump 63 may be driven by a motor M. The motor M may be controlled by a pressure sensor (not shown) connected to port 2005, which may start the motor M when pressure supplied by the second pump 62 to the steering circuit 50 drops below a threshold pressure value.

A control system 63' of the third pump 63 may be coupled to the steering load sensing pressure signal S4 via port 2004 to control the output of the third pump 63 while it is in operation. For example, pressure supplied by the third pump 63 may be applied to port 2004 which relieves the applied pressure proportionately to the load sensing pressure signal S4. The control system 63' may be operable responsive to the remaining, applied pressure upstream of port 2004 which is thus proportionate to the load sensing pressure signal S4. The control system 63' may include a bypass valve (not shown) which is operable by the remaining, applied pressure to selectively relieve pressure across the pump 63 so as to adjust its output pressure and flow proportionately to the load sensing pressure signal S4.

In order to limit the steering load sensing pressure signal S4, the steering and work function module 2000 may further include a steering load sensing relief valve 2027. Valve 2027 is configured to relieve excess pressure from the internal flowpaths carrying the signal S4 to tank 64 via a port 2003 opening through the at least one external surface 2700.

The work function pilot pressure supply P1, which operates the work function control valve assembly, may be delivered to the work control module 3000 from the steering and work function module 2000 via a pilot pressure supply outlet 2304 which opens through the second interface surface 2300 to communicate with a corresponding port in interface surface 3400. The pilot pressure may be supplied to the steering and work function module 2000 from the first pump 61 via the fan and brake function module 1000 in the connected configuration, through a port opening through interface surface 1100 in fluid communication with a pilot pressure supply inlet 2201 opening through the first interface surface 2200.

The valves 2016 may further include a pilot pressure limit valve 2026 which is configured to limit the pilot pressure received from the pilot pressure supply inlet 2201 and to supply the limited pilot pressure P1 to the pilot pressure supply outlet 2304.

The pilot pressure limit valve 2026 may be arranged in fluid communication with a drain flowpath 2022 of the steering and work function module 2000, which is arranged in the connected configuration to relieve hydraulic pressure from internal drain flowpaths of the work control valve module 3000 via the fan and brake function valve module 1000 to tank 64.

The drain flowpath 2022 opens through a drain inlet 2303 in the second interface surface 2300 and a drain outlet 2204 in the first interface surface 2200. In use in the connected configuration, the drain inlet 2303 communicates with internal drain flowpaths of the work control module 3000, while the drain outlet 2204 communicates with a corresponding port in the interface surface 1100 of the fan and brake function module 1000 which in turn communicates with an outlet to tank 64.

In order to extend the external hydraulic connection point for the supply of pressure from the fan and brake function module 1000 to the fan circuit 30 of the vehicle in the connected configuration, the internal flowpaths 2013 of the steering and work function module 2000 may include an extension flowpath 2028.

The extension flowpath 2028 opens through an extension inlet 2202 in the first interface surface 2200 and an extension outlet 2011 in the at least one further external surface 2700 so that the extension inlet 2202 is in uninterrupted fluid communication with the extension outlet 2011 via the extension flowpath 2028. That is to say, the extension flowpath 2028 does not contain any valves or other obstructions to prevent hydraulic fluid from flowing freely in any direction through the extension flowpath 2028 between the extension inlet 2202 and the extension outlet 2011. Thus, the function of the fan and brake function module 1000 in controlling the supply of pressure to the fan circuit 30 is unaffected by the presence of the steering and work function module 2000 in the connected configuration.

Additional ports 2001, 2002, 2005 may be provided in the at least one external surface 2700 for connection of pressure sensors. Various test ports 90 may be provided.

INDUSTRIAL APPLICABILITY

In summary, the steering and work function module 2000 is configured to receive a supply of hydraulic pressure, both from the first pump 61 via port 2205 in the first interface surface 2200 when connected to the fan and brake function module 1000, and from the second pump 62 via port 2006 in the external surface 2700. The module combines both flows to supply the work function circuit 40 of the vehicle via port 2301 in the second interface surface 2300 when connected to the work control module 3000. The module further prioritises flow from the second pump 62 to the steering supply outlet 2009 over the work function outlet 2301. At the same time the module 2000 restricts flow from the first pump inlet 2205 to the work function outlet 2301 so as to prioritise and maintain pressure upstream of the first pump inlet 2205. This protects the hydraulic circuits of the connected, fan and brake function module 1000, which may supply service brake and cooling fan circuits of the vehicle 10.

The novel module, also referred to and exemplified in the above described embodiment as the steering and work function module 2000, may be used as part of a modular valve assembly to provide optimal use of the pump capacity to supply work equipment that requires a combined flow when installed in a work vehicle with more than one pump.

By grouping together both priority valves and the flowpaths from both of the first and second pumps, the novel module ensures that the steering circuit and upstream brake and fan circuits are protected when combined flow is supplied to the work function circuit, while accommodating alternative valve configurations for the other, upstream and downstream elements by suitable adaptation of the other modules of the assembly. In this way the valve assembly can be adapted to the requirements of different vehicles while ensuring that circuit priorities are always respected.

Advantageously, the novel module can further include shuttle valves for supplying control pressure signals to the pumps, thus combining together the circuit prioritisation and pump control functions of a complex valve assembly into a single module. Since pump control governs the supply of pressure and circuit prioritisation governs the availability of the supplied pressure to critical circuits, this further ensures that pressure is available to the critical circuits of the vehicle even in alternative configurations of the modular assembly.

By routing a drain flowpath and/or an extension flowpath through the novel module it is possible also to reconfigure the position of the hydraulic connection ports of the adjacent modules in the connected configuration to suit the particular connection layout of the vehicle in which the assembly is to be installed.

Other modules of the valve assembly may be used on their own in vehicles with different specifications requiring less than all of the modules. For example, the fan and brake function module 1000 may be used on its own or in combination with the auxiliary module 4000 to supply hydraulic pressure from the first pump inlet to the fan and service brake circuits, optionally also the parking brake and differential lock actuator circuits, of a vehicle that does not require a supply to steering and work function circuits.

Since the same modules can be combined together with the novel module to supply all the functional circuits of a work vehicle, stockholding may be reduced.

Many further adaptations are possible within the scope of the claims.

In the claims, reference numerals and characters are provided in parentheses, purely for ease of reference, and are not to be construed as limiting features.

LIST OF ELEMENTS 1 hydraulic valve assembly
10 vehicle
11 engine
20 wheels
21 first service brake circuit
22 second service brake circuit
23 service brake actuator
24 hydraulic accumulator
25 pedal
26 automatic retarding system
30 fan circuit
31 cooling fan
32 fan actuator
33 heat exchanger
40 work function circuit
41 equipment
42 equipment actuator
43 work function control signal generator
50 steering circuit
51 steering actuator
52 steering controls
61 first hydraulic pump
62 second hydraulic pump
63 third hydraulic pump
63' control system
64 tank or tanks
70 parking brake circuit
71 parking brake actuator
72 hydraulic accumulator
80 differential lock circuit
81 differential lock
90 test port
1000 fan and brake function module
1100 interface surface
1500 interface surface
2000 steering and work function module
2001 port
2002 port
2003 port
2004 third pump control port
2005 port
2006 second pump inlet
2007 third pump inlet
2008 steering load sensing pressure signal port
2009 steering supply outlet
2010 second pump control pressure signal port
2011 extension outlet
2012 first pump control pressure signal port
2013 internal flowpaths
2014 work function supply circuit
2015 steering supply circuit
2016 valves
2020 steering function priority valve
2021 fan and brake function priority valve
2022 drain flowpath
2023 first load sensing shuttle valve
2024 second load sensing shuttle valve
2025 check valves
2026 pilot pressure limit valve
2027 steering load sensing relief valve
2028 extension flowpath
2098 connection elements
2099 valve block
2200 first interface surface
2201 pilot pressure supply inlet
2202 extension inlet
2203 fan and brake function load sensing pressure signal port
2204 drain outlet
2205 first pump inlet
2300 second interface surface
2301 work function outlet
2302 work function load sensing pressure signal port
2303 drain inlet
2304 pilot pressure supply outlet
2700 further external surface
3000 work control valve module
3400 interface surface
4000 auxiliary module
4600 interface surface
M motor
P1 work function pilot pressure supply
S1 fan and brake function load sensing pressure signal
S2 work function load sensing pressure signal
S3 work function control signal
S4 steering load sensing pressure signal
S12 first pump control pressure signal
S24 second pump control pressure signal

What is claimed is:

1. A hydraulic valve module (2000) for use in a vehicle (10), the vehicle (10) including:
 a plurality of wheels (20),
 an equipment (41) for carrying out a work function of the vehicle,
 a plurality of hydraulic circuits (40, 50), and
 first and second hydraulic pumps (61, 62) for supplying hydraulic pressure to the hydraulic circuits;
 the hydraulic circuits including:
  a steering circuit (50) including at least one steering actuator (51) for steering the wheels (20), and
  a work function circuit (40) including at least one equipment actuator (42) for operating the equipment (41);
 the hydraulic valve module (2000) including:
  a plurality of valves (2016), and
  a monolithic valve block (2099);
 the valve block (2099) having:
  a plurality of internal flowpaths (2013),
  an external, first interface surface (2200),
  an external, second interface surface (2300),
  at least one further external surface (2700);
 the first interface surface (2200) being sealingly connectable, in a connected configuration, to a corresponding interface surface (1100) of a further, fan and brake function valve module (1000);
 the second interface surface (2300) being sealingly connectable, in the connected configuration, to a corresponding interface surface (3400) of a further, work control valve module (3000);
 the valves being arranged in fluid communication with respective ones of the internal flowpaths (2013) to define:

a work function supply circuit (2014) for supplying hydraulic pressure from each of a first pump inlet (2205) and a second pump inlet (2006) to a work function outlet (2301), and a steering supply circuit (2015) for supplying hydraulic pressure from the second pump inlet (2006) to a steering supply outlet (2009);

the first pump inlet (2205) opening through the first interface surface (2200) to receive a supply of hydraulic pressure from the first pump (61) via the fan and brake function valve module (1000) in use in the connected configuration;

the second pump inlet (2006) opening through the at least one further external surface (2700) to receive a supply of hydraulic pressure from the second pump (62) in use;

the steering supply outlet (2009) opening through the at least one further external surface (2700) to supply hydraulic pressure from the steering supply circuit (2015) to the steering circuit (50) of the vehicle in use;

the work function outlet (2301) opening through the second interface surface (2300) to supply hydraulic pressure from the work function supply circuit (2014) via the work control valve module (3000) to the work function circuit (40) of the vehicle in use in the connected configuration;

the plurality of valves including:

a steering function priority valve (2020) configured to receive a steering load sensing pressure signal (S4) from a steering load sensing pressure signal port (2008) opening through the at least one further external surface (2700), and operable responsive to the steering load sensing pressure signal (S4) to restrict the supply of hydraulic pressure from the second pump inlet (2006) to the work function outlet (2301) through the work function supply circuit (2014), so as to maintain the supply of hydraulic pressure from the second pump inlet (2006) to the steering supply outlet (2009) through the steering supply circuit (2015); the steering load sensing pressure signal (S4) being received in use from the steering circuit (50) of the vehicle (10); and a fan and brake function priority valve (2021) configured to receive a fan and brake function load sensing pressure signal (S1) from a fan and brake function load sensing pressure signal port (2203) opening through the first interface surface (2200), and operable responsive to the fan and brake function load sensing pressure signal (S1) to restrict the supply of hydraulic pressure from the first pump inlet (2205) to the work function outlet (2301) through the work function supply circuit (2014), so as to maintain hydraulic pressure upstream of the first pump inlet (2205); the fan and brake function load sensing pressure signal (S1) being received from the fan and brake function valve module (1000) in use in the connected configuration.

2. A hydraulic valve module (2000) according to claim 1, wherein the plurality of valves (2016) further include:

a first load sensing shuttle valve (2023) configured:

to receive and resolve the fan and brake function load sensing pressure signal (S1), and a work function load sensing pressure signal (S2) from a work function load sensing pressure signal port (2302) opening through the second interface surface (2300), and based on the fan and brake function load sensing pressure signal (S1) and the work function load sensing pressure signal (S2), to produce a first pump control pressure signal (S12) at a first pump control pressure signal port (2012) opening through the at least one further external surface (2700) for controlling the first pump (61) in use; and a second load sensing shuttle valve (2024) configured:

to receive and resolve the steering load sensing pressure signal (S4) and the work function load sensing pressure signal (S2), and based on the steering load sensing pressure signal (S4) and the work function load sensing pressure signal (S2), to produce a second pump control pressure signal (S24) at a second pump control pressure signal port (2010) opening through the at least one further external surface (2700) for controlling the second pump (62) in use.

3. A hydraulic valve module (2000) according to claim 1, wherein the steering supply outlet (2009) is arranged in fluid communication with a third pump inlet (2007), the third pump inlet (2007) opening through the at least one further external surface (2700) to receive, in use, a supply of hydraulic pressure from a third hydraulic pump (63) of the vehicle (10); and the steering load sensing pressure signal (S4) is arranged in fluid communication with a third pump control port (2004) opening through the at least one further external surface (2700) for controlling operation of the third pump (63) in use.

4. A hydraulic valve module (2000) according to claim 1, wherein the plurality of valves (2016) further include a pilot pressure limit valve (2026) configured to limit pilot pressure received from a pilot pressure supply inlet (2201) opening through the first interface surface (2200) and to supply a pilot pressure (P1) to a pilot pressure supply outlet (2304) opening through the second interface surface (2300).

5. A hydraulic valve module (2000) according to claim 4, wherein the pilot pressure limit valve (2026) is arranged in fluid communication with a drain flowpath (2022) between a drain inlet (2303) in the second interface surface (2300) and a drain outlet (2204) in the first interface surface (2200) to relieve hydraulic pressure from the work control valve module (3000) via the fan and brake function valve module (1000) to tank (64) in use in the connected configuration.

6. A hydraulic valve module (2000) according to claim 1, wherein the internal flowpaths (2013) include an extension flowpath (2028), the extension flowpath (2028) opening through an extension inlet (2202) in the first interface surface (2200) and an extension outlet (2011) in the at least one further external surface (2700), wherein the extension inlet (2202) is in uninterrupted fluid communication with the extension outlet (2011) via the extension flowpath (2028).

* * * * *